United States Patent
Ivanov

(10) Patent No.: US 7,529,403 B2
(45) Date of Patent: May 5, 2009

(54) WEIGHTED ENSEMBLE BOOSTING METHOD FOR CLASSIFIER COMBINATION AND FEATURE SELECTION

(75) Inventor: Yuri Ivanov, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 673 days.

(21) Appl. No.: 11/294,938

(22) Filed: Dec. 6, 2005

(65) Prior Publication Data
US 2007/0127825 A1 Jun. 7, 2007

(51) Int. Cl.
*G06K 9/62* (2006.01)

(52) U.S. Cl. .................. 382/156; 382/158

(58) Field of Classification Search .................. None
See application file for complete search history.

(56) References Cited

U.S. PATENT DOCUMENTS

2005/0100208 A1\* 5/2005 Suzuki et al. ............ 382/157

OTHER PUBLICATIONS

Younes et al., "Linear and Nonlinear Combinations of Connectionist Models for Local Diagnosis in Real-Time Telephone Network Traffic Management", published 1997.\*
A.F. Bobick, "Movement, activity, and action: The role of knowledge in the perception of motion," Philosophical Transactions Royal Society London B, Royal Philosophical Society, 1997.
Aggarwal et al., "Human motion analysis: A review," Computer Vision and Image Understanding 73(3) (1999), 428-440.
Nevatia, et al., "Video-based event recognition: activity representation and probabilistic recognition methods," CVIU 96 (Nov. 2004), No. 2, 129-162.
D. Comaniciu, V. Ramesh, and P. Meer., "Real-time tracking of nonrigid objects using mean shift", CVPR (2000), 673-678.
Yoav Freund and Robert E. Schapire, "A decision-theoretic generalization of on-line learning and an application to boosting", Computer and System Sciences 55(1) (1997), 119-139.
Berthold K.P. Horn and Brian G. Schunck, "Determining optical flow", Artificial Intelligence 17 (1981), 185-203.
Y. Ivanov, B. Heisele, and T. Serre, "Using component features for face recognition", International Conference on Automatic Face and Gesture Recognition (Seoul, Korea), 2004.
A. Kapoor, R. Picard, and Y. Ivanov, "Probabilistic combination of multiple modalities to detect interest", International Conference on Pattern Recognition (Cambridge, UK), 2004.
R. Meir and G. Rtsch, "An introduction to boosting and leveraging", In S. Mendelson and A. Smola, editors, Advanced Lectures on Machine Learning, LNCS (Copyright by Springer Verlag), 2003, pp. 119-184.

(Continued)

*Primary Examiner*—Vikkram Bali
*Assistant Examiner*—Soo Jin Park
(74) *Attorney, Agent, or Firm*—Dirk Brinkman; Gene Vinokur

(57) ABSTRACT

A method constructs a strong classifier from weak classifiers by combining the weak classifiers to form a set of combinations of the weak classifiers. Each combination of weak classifiers is boosted to determine a weighted score for each combination of weak classifiers, and combinations of weak classifiers having a weighted score greater than a predetermined threshold are selected to form the strong classifier.

5 Claims, 1 Drawing Sheet

OTHER PUBLICATIONS

R. J. Morris and D. C. Hogg, "Statistical models of object interaction", Workshop on Visual Surveillance (Bombay, India), IEEE, 1998.

P. Smith, N. Lobo, and M. Shah, "Temporal boost for event recognition", IEEE International Conference on Computer Vision (ICCV) (Beijing, China), 2005.

P. Viola and M. Jones, "Robust real-time object recognition", ICCV (Vancouver, Canada), 2001.

P. Viola, M.J. Jones, and D. Snow, "Detecting pedestrians using patterns of motion and appearance", IEEE International Conference on Computer Vision (ICCV), 2003, pp. 734-741.

Ross et al., "Information fusion in biometrics," Pattern Recognition Letters, vol. 24, Issue 13, pp. 2115-2125 24, 2003.

Pekalska, et al., "A discussion on the classifier projection space for classifier combining," 3rd International Workshop on Multiple Classifier Systems, Springer Verlag, 2002, pp. 137-148.

Kittler, et al., "Combining evidence in multimodal personal identity recognition systems," Intl. Conference on Audio- and Video-Based Biometric Authentication, 1997.

Tax et al., "Combining multiple classifiers by averaging or by multiplying?," Pattern Recognition 33 (2000), 1475-1485.

Bilmes et al., "Directed graphical models of classifier combination: Application to phone recognition," Intl. Conference on Spoken Language Processing, 2000.

* cited by examiner

WEIGHTED ENSEMBLE BOOSTING METHOD FOR CLASSIFIER COMBINATION AND FEATURE SELECTION

FIELD OF THE INVENTION

This invention relates generally to computer implemented classifiers, and more specifically to strong classifiers that are constructed by combining multiple weak classifiers.

BACKGROUND OF THE INVENTION

Recognition of activities and objects plays a central role in surveillance and computer vision applications, see A. F. Bobick, "Movement, activity, and action: The role of knowledge in the perception of motion," Royal Society Workshop on Knowledge-based Vision in Man and Machine, 1997; Aggarwal et al., "Human motion analysis: A review," Computer Vision and Image Understanding, vol. 73, no. 3, pp. 428-440, 1999; and Nevatia et al., "Video-based event recognition: activity representation and probabilistic recognition methods," Computer Vision and Image Understanding, vol. 96, no. 2, pp. 129-162, November 2004.

Recognition, in part, is a classification task. The main difficulty in event and object recognition is the large number of events and object classes. Therefore, systems should be able to make a decision based on complex classifications derived from a large number of simpler classifications tasks.

Consequently, many classifiers combine a number of weak classifiers to construct a strong classifier. The main purpose of combining classifiers is to pool the individual outputs of the weak classifiers as components of the strong classifier, the combined classifier being more accurate than each individual component classifier.

Prior art methods for combining classifiers include methods that apply sum, voting and product combination rules, see Ross et al., "Information fusion in biometrics," Pattern Recognition Letters, vol. 24, no. 13, pp. 2115-2125, 2003; Pekalska et al., "A discussion on the classifier projection space for classifier combining," 3rd International Workshop on Multiple Classifier Systems, Springer Verlag, pp. 137-148, 2002; Kittler et al., "Combining evidence in multimodal personal identity recognition systems," Intl. Conference on Audio- and Video-Based Biometric Authentication, 1997; Tax et al., "Combining multiple classifiers by averaging or by multiplying?" Pattern Recognition, vol. 33, pp. 1475-1485, 2000; Bilmes et al., "Directed graphical models of classifier combination: Application to phone recognition," Intl. Conference on Spoken Language Processing, 2000; and Ivanov, "Multi-modal human identification system," Workshop on Applications of Computer Vision, 2004.

SUMMARY OF THE INVENTION

One embodiment of the invention provides a method for combining weak classifiers into a strong classifier using a weighted ensemble boosting. The weighted ensemble boosting method combines Bayesian averaging strategy with a boosting framework, finding useful conjunctive feature combinations of the classifiers and achieving a lower error rate than the prior art boosting process. The method demonstrates a comparable level of stability with respect to the composition of a classifier selection pool.

More particularly, a method constructs a strong classifier from weak classifiers by combining the weak classifiers to form a set of combinations of the weak classifiers. Each combination of weak classifiers is boosted to determine a weighted score for each combination of weak classifiers, and combinations of weak classifiers having a weighted score greater than a predetermined threshold are selected to form the strong classifier.

DETAILED DESCRIPTION OF THE PREFERRED EMBODIMENT

Figure 1:
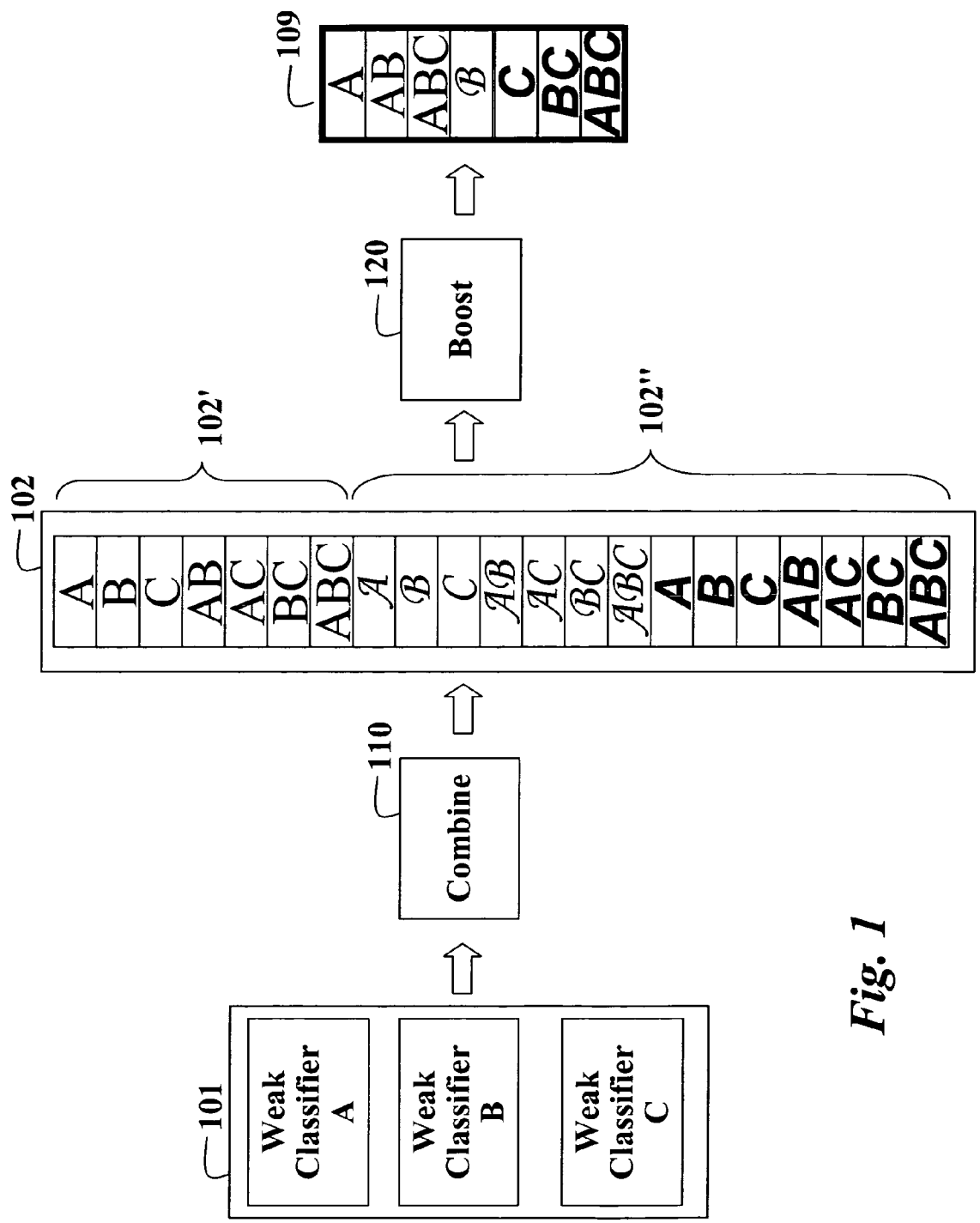
FIG. 1 is a flow diagram of a method for constructing a strong classifier from a combination of weak classifiers according to an embodiment of the invention.

FIG. 1 shows a method for constructing a strong classifier 109 from weak classifiers (A, B, C) 101 according to an embodiment of the invention. The weak classifiers are combined 110 to produce a set of combined classifiers 102. Then, a boosting process 120 is applied to the set of combined classifiers to construct the strong classifier 109.

Weak Classifiers

The weak classifiers can include binary and multi-class classifiers. A binary classifier determines whether a single class is recognized or not. A multi-class classifier can recognize several classes.

An output of each weak classifier can be represented by posterior probabilities. Each probability indicates how certain a classifier is about a particular classification, e.g., the object identity. In addition, each weak classifier can be associated with a confidence matrix. The confidence matrix indicates how well the classifier performs for a particular class. The confidence matrices are obtained by training and validating the classifiers with known or 'labeled' data.

Combining

The combining step can include all possible linear combinations 102' of the weak classifiers, as well as various non-linear combinations 102" For example, six weak classifiers can yield over 500 combinations.

The combining 110 can also use an adaptation of an approximate Bayesian combination. The Bayesian combination uses some measure of classifier confidence to weigh the prediction probabilities of each weak classifier with respect to an expected accuracy of the weak classifier for each of the classes, see Ivanov, "Multi-modal human identification system," Workshop on Applications of Computer Vision, 2004; and Ivanov et al., "Using component features for face recognition," International Conference on Automatic Face and Gesture Recognition, 2004, both incorporated herein by reference.

More particularly, an output of weak classifier, λ, is viewed as a random variable, $\tilde{\omega}$ taking integer values from 1 to K, i.e., the number of classes. If, for each classifier, the probability distribution over values of a true class label ω is available for a given classifier prediction, $P_\lambda(\omega|\tilde{\omega})$, then the approximate Bayesian combination can be derived via marginalization of individual class predictions of each weak classifier:

$$P_a(\omega_i \mid x) = \sum_{k=1}^{K} w_k \sum_{j=1}^{J} \frac{P_k(\omega_i \mid \tilde{\omega}_j) P_k(\tilde{\omega}_j \mid x)}{P_k(\omega_i \mid x)},$$

where $P_k(\tilde{\omega}|x)$ is the prediction probability of the weak classifier, and $w_k$ is a weight of each weak classifier. Equation weights a prediction of each classifier in accordance to the confidence matrix associated with the class.

The combinations in the set 102 are formed for singles, pairs, triples, etc., of the weak classifiers 101. The non-linear transformation is according to:

$$P_n^\beta(\omega_i \mid x) = \frac{\exp\left(\beta \sum_{j \in S_n} P_j(\omega_i \mid x)\right)}{\sum_{c=1}^{C} \exp\left[\left(\beta \sum_{k \in S_n} P_k(\omega_c \mid x)\right)\right]},$$

where $P_k(\omega_j \mid x)$ is a weighted weak classifier according to a non-linear weight $\beta$ and $S_n$ is an $n^{th}$ classifier combination. For an exhaustive enumeration of combinations, the total number of the tuples for every value of $\beta$ is given by the following relation:

$$N = \sum_{n=1}^{K} \binom{K}{n} = 2^K - 1.$$

where K is the number of weak classifiers and N is the number of tuples. That is, if 8 different values of $\beta$ are used to form combinations of 6 classifiers, the total number of these combinations 102 comes to 504.

Boosting

As stated above, the strong classifier 109 is derived from the set of combined weak classifiers 102. The boosting essentially 'discards' combinations in the set that have low 'weights', e.g., weights less than some predetermined threshold or zero, and keeps the combinations that are greater than the predetermined threshold. The number of elements in the strong classifier can be controlled by the threshold.

The method adapts the well known AdaBoost process, Freund et al., "A decision-theoretic generalization of on-line learning and an application to boosting," Computational Learning Theory, Eurocolt '95, pp. 23-37, 1995, incorporated herein by reference.

The AdaBoost process trains each classifier in a combination with increasingly more difficult data, and then uses a weighted score. During the training, the combined classifiers are examined, in turn, with replacement. At every iteration, a greedy selection is made. The combined classifier that yields a minimal error rate on data misclassified during a previous iteration is selected, and the weight is determined as a function of the error rate. The AdaBoost process iterates until one of the following conditions is met: a predetermined number of iterations has been made, a pre-determined number of classifiers have been selected, the error rate decreases to a pre-determined threshold, or no further improvement to the error rate can be made.

Formally, a probability distribution over the classes can be expressed as a weighted sum of the scores:

$$P_b(\omega_i \mid x) \propto \sum_{k=1}^{K} W_k [\mathrm{argmax} P_k(\tilde{\omega} \mid x) = i],$$

where the weight $W_k$ is the aggregate weight of the $k^{th}$ classifier:

$$W_k = \sum_{t=1}^{T} w_t [f_t = f_k]$$

This equation states that the weight of the $k^{th}$ classifier is the sum of weights of all instances t of the classifier, where the classifier $f_k$ is selected by the process.

Feature stacking can then use the strong classifier trained on the outputs of weak classifiers stacked into a single vector. That is, the input for the strong classifier, $\tilde{x}$, is formed as follows:

$$\tilde{X} = (P_1(\omega \mid x)^T, P_2(\omega \mid x)^T, \ldots, P_K(\omega \mid x)^T)^T,$$

and then the strong classifier is trained on pairs of data, $(X_i, Y_i)$, where $Y_i$ is the class label of the $i^{th}$ data point.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A computer implemented method for constructing a strong classifier, comprising a computer processor for performing steps of the method, comprising the steps of:
   selecting a plurality of weak classifiers;
   representing an output of each weak classifier by a posterior probability;
   associating each weak classifier with a confidence matrix;
   combining the weak classifiers to form a set of combinations of the weak classifiers, in which the combining is an approximate Bayesian combination, and in which an output $\lambda$ of each weak classifier is a random variable $\tilde{\omega}$ taking integer values from 1 to K, the number of classes, and a probability distribution over values of a true class label $\omega$ is $P_\lambda(\omega \mid \tilde{\omega})$, and the approximate Bayesian combination is $$P_a(\omega_i \mid x) = \sum_{k=1}^{K} w_k \sum_{j=1}^{J} \underbrace{P_k(\omega_i \mid \tilde{\omega}_j) P_k(\tilde{\omega}_j \mid x)}_{P_k(\omega_i \mid x)},$$

where $P_k(\tilde{\omega} \mid x)$ is a prediction probability of the weak classifier, and $w_k$ is a weight of the classifier;
   boosting each combination of the weak classifiers to determine a weighted score for each combination of the weak classifiers; and
   selecting combinations of the weak classifiers having a weighted score greater than a predetermined threshold to form the strong classifier.

2. The method of claim 1, in which the weak classifiers include binary and multi-class classifiers.

3. The method of claim 1, in which the combinations include linear and non-linear combinations of the weak classifiers.

4. The method of claim 1, in which the weight is according to the confidence matrix of the class.

5. The method of claim 1, in which the set of combinations is formed according to $$P_n^\beta(\omega_i \mid x) = \frac{\exp\left(\beta \sum_{j \in S_n} P_j(\omega_i \mid x)\right)}{\sum_{c=1}^{C} \exp\left[\left(\beta \sum_{k \in S_n} P_k(\omega_c \mid x)\right)\right]},$$

where $P_k(\omega_j \mid x)$ is a weighted weak classifier according to a non-linear weight $\beta$, and $S_n$ is an $n^{th}$ classifier combination.

* * * * *